United States Patent [19]

Miyata et al.

[11] Patent Number: 5,142,474
[45] Date of Patent: Aug. 25, 1992

[54] ELECTRONIC CONTROL APPARATUS HAVING A FAIL-SAFE MECHANISM FOR A VEHICLE

[75] Inventors: Yasumichi Miyata, Komaki; Kazumichi Tsutsumi, Himeji; Akihiko Mori, Himeji; Hiroyuki Kouzuki, Himeji; Yasuo Naito, Himeji; Nobukazu Nakamura, Himeji, all of Japan

[73] Assignee: Mitsubishi Denki K.K., Tokyo, Japan

[21] Appl. No.: 665,068

[22] Filed: Mar. 6, 1991

[30] Foreign Application Priority Data

Mar. 9, 1990 [JP] Japan .................. 2-59320

[51] Int. Cl.⁵ .................. G05B 9/02; G05B 9/03; G05B 23/02
[52] U.S. Cl. .................. 364/424.03; 364/184; 364/431.11; 340/507; 340/825.16; 371/20.1
[58] Field of Search .................. 364/431.11, 424.03, 364/184, 131, 424.01, 424.05; 340/507, 530, 532, 825.16; 371/14, 20.1; 307/440, 442

[56] References Cited

U.S. PATENT DOCUMENTS

| | | | |
|---|---|---|---|
| 4,532,594 | 7/1985 | Hosaka et al. | 364/431.11 |
| 4,541,050 | 9/1985 | Honda et al. | 364/431.11 X |
| 4,635,257 | 1/1987 | Shinohara | 371/14 X |
| 4,881,227 | 11/1989 | Bühren | 364/431.11 X |
| 4,986,385 | 1/1991 | Masaki | 364/426.04 X |
| 5,038,879 | 8/1991 | Naito et al. | 364/431.11 X |

FOREIGN PATENT DOCUMENTS 1-148645  6/1989  Japan .

Primary Examiner—Parshotam S. Lall
Assistant Examiner—Edward J. Pipala
Attorney, Agent, or Firm—Sughrue, Mion, Zinn, Macpeak & Seas

[57] ABSTRACT

An electronic control apparatus for a vehicle includes first and second controllers between which the transmission of information is performed. A processor in the form of a microcomputer processes information transmitted from the first controller to the second controller and controls an actuator such as a brake actuator based on the information thus processed. An abnormality detecting circuit detects an interruption of signal transmission between the first and second controllers for a predetermined period of time, and it stops the control of the second controller on the actuator when it detects such an interruption. A transmission inhibitor is provided for inhibiting signal transmission from the second controller to the first controller when the abnormality detector detects an interruption.

7 Claims, 3 Drawing Sheets

ELECTRONIC CONTROL APPARATUS HAVING A FAIL-SAFE MECHANISM FOR A VEHICLE

BACKGROUND OF THE INVENTION

The present invention relates to an electronic control apparatus which is adapted to be mounted on a vehicle for controlling an anti-lock brake apparatus, a traction control apparatus and the like.

FIG. 3 shows, in a block form, an example of a conventional electronic controller in the form of a vehicle slip control apparatus as described in Japanese Patent Laid-Open No. 1-148645. In this figure, information processed by an anti-look control means 1 and a traction control means 2 are communicated to each other as serial data. Specifically, wheel-speed sensors 1 provided for corresponding road wheels of a vehicle each generate an output signal representative of the rotational speed of a corresponding road wheel which is input to an interface 5 of a first control box 8 and converted there into a binary code to provide a pulse signal. The pulse signal thus produced is fed to the anti-lock control means 1 which successively calculates, based on the information thus input, the rotational speed, the acceleration and deceleration of each road wheel, the estimated speed of the vehicle and the like. Based on the results of these calculations, the antilock control means 1 then controls a first actuator 6 so as to properly adjust brake forces applied for braking the respective wheels. Also, the results of the calculations of the anti-lock control means 1 are successively sent to a first serial data transmission means 10 in a parallel fashion. The first serial data transmission means 10 transmits the thus supplied parallel data to a second serial data transmission means 11 inside a second control box 9 in a time-shared multiplex transmission manner. The serial data transmission means 11 converts the serial data thus received into parallel data which is in turn fed to the traction control means 2 so as to control a second actuator 7 for adjusting the traction force of the engine and/or brake forces.

With the above-described conventional vehicle slip control apparatus as constructed above, information communicated between the anti-lock control mean 1 and the traction control means is of very much importance from the control point of view. Therefore, in preparation for the case in which data transmission between the anti-lock control means 1 and the traction control means 2 becomes faulty, each of the control means 1, 2 is provided with some failsafe means such as a control-disabling means for ensuring the operational stability of the vehicle. However, such failsafe means are generally controlled by a microcomputer using a certain software, so it is not necessarily assured that if there arises an abnormality or malfunction in one of the software-controlled failsafe means, the transmission and control output of the faulty or abnormal failsafe means is made to shift to the safe side of operation. In addition, since the actuators 6, 7 particularly control the brakes, it is most important to ensure safe operation thereof.

SUMMARY OF THE INVENTION

The present invention is intended to obviate the above-described problems encountered with the conventional electronic control apparatus.

An object of the invention is to provide a novel and improved electronic control apparatus for a vehicle in which if a hardware portion detects an abnormality in the signal o data transmission between first and second control means, an actuator to be controlled by one of the control means is made inoperative and the signal or data transmission is disabled or prohibited for improved safety of the vehicle.

In order to achieve the above object, according to the present invention, there is provided an electronic control apparatus for a vehicle including first and second control means between which the transmission of information is performed. The apparatus comprises: processing means for processing information transmitted from the first control means to the second control means and controlling an actuator based on the information thus processed; and abnormality detecting means for detecting an interruption of signal transmission between the first and second control means for a predetermined period of time, the abnormality detecting means being operable to stop the control of the second control means on the actuator when it detects such an interruption.

Preferably, transmission inhibiting means is provided for inhibiting signal transmission from the second control means to the first control means when the abnormality detecting means detects an interruption in the signal transmission from the first control means to the second control means for the predetermined period of time.

The first and second control means are connected to each other through a first transmission line for transmitting a signal from the first control means to the second control means and a second transmission line for transmitting a signal from the second control means to the first control means. In a preferred embodiment, the abnormality detecting means comprises an integrator connected to the first transmission line for integrating the output signal of the first control means, and a comparator for comparing the output signal of the integrator with a reference level and generating a high-level output at its output terminal when the integrator output is greater than the reference level.

Preferably, drive means is provided for driving the actuator. The drive means includes an AND gate which has a first input terminal connected to the output terminal of the comparator, a second input terminal connected to the processing means and an output terminal connected to the actuator.

Preferably, the transmission inhibiting means comprises an AND gate which has a first input terminal connected to the output terminal of the comparator, a second input terminal connected to the processing means and an output terminal connected to the first control means.

In a preferred embodiment, the first control means operates to stop signal transmission when the transmission inhibiting means inhibits signal transmission from the second control means to the first control means.

The above and other objects, features and advantages of the present invention will become apparent from the following detailed description of a preferred embodiment of the invention taken in conjunction with the accompanying drawings.

PREFERRED EMBODIMENT OF THE INVENTION

A preferred embodiment of the present invention will now be described in detail with reference to the accompanying drawings.

Figure 1:
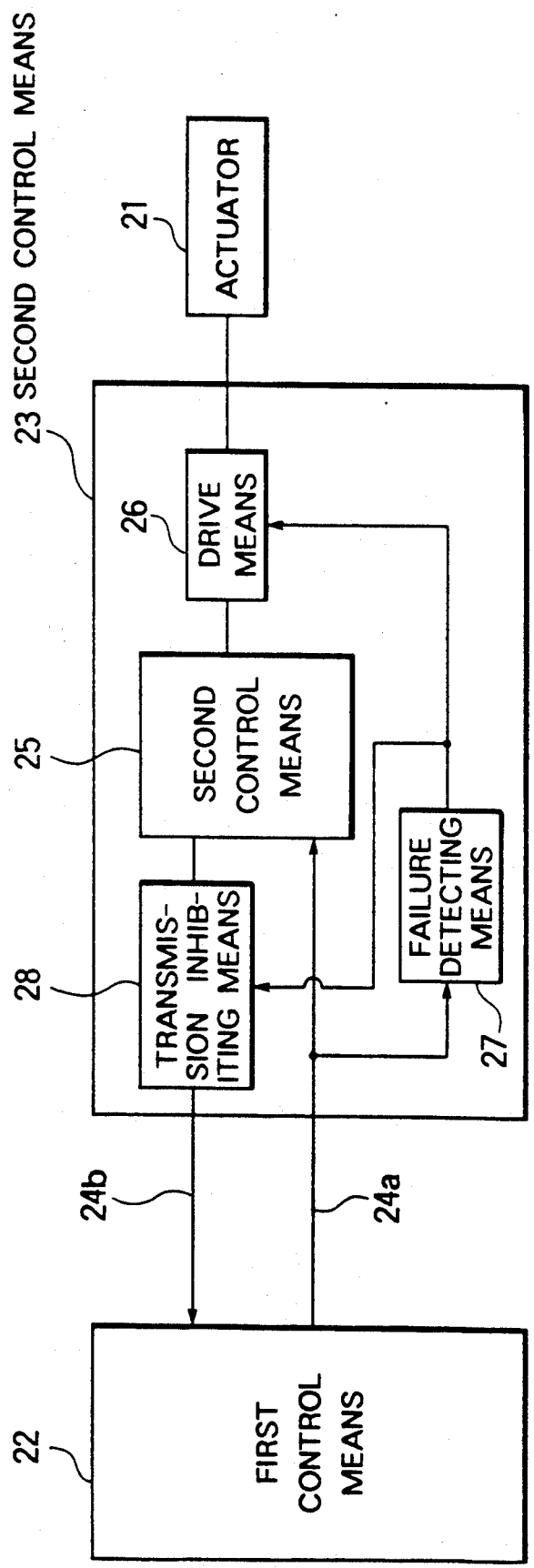
FIG. 1 is a schematic block diagram of an electronic control apparatus for a vehicle in accordance with the present invention.

Referring to the drawings and first to FIG. 1, there is shown the general construction of an electronic control apparatus for a vehicle in accordance with the present invention. The apparatus illustrated includes an actuator 21 in the form of a brake force control means for controlling brake forces applied to respective road wheels of a vehicle, a first control means 22 and a second control means 23. The first and second control means 22, 23 are connected to each other through a first and a second transmission line 21a, 24b so as to perform the transmission of information therebetween.

The second control means 23 includes a processing means 26 in the form of a control quantity calculation means for processing the information transmitted from the first control means 22 to the second control means 23 via the first transmission line 24a as well as other information input thereto (not shown) and generating a signal to a drive means 26 for driving the brake force control means 21, an abnormality detecting means 27 for detecting an abnormality in the transmission of information from the first control means 22, i.e., an interruption of signal transmission from the first control means 22 for a predetermined period of time, and a transmission inhibiting means 28 for inhibiting the transmission between the first and second control means 22, 23.

When an abnormality is detected by the abnormality detecting means 27, the transmission inhibiting means 28 operates to control the first control means 22 such that the first control means 22 stops transmitting information to the second control means 23 via the first transmission line 24a. Simultaneous with this, the abnormality detecting means 27 also operates the drive means 26 to stop the operation of the brake force control means 21.

Now, the operation of the above-described embodiment will be described in detail. The information from the first control means 22 as well as other various pieces of information (not shown) are input to the control quantity calculation means 25 of the second control means 23 which performs prescribed processing thereon to provide an output signal to the drive means 20. As a result, the drive means 20 drives the brake force control means 21 so as to provide a predetermined brake force for each road wheel. When there arises an interruption in the transmission of a signal from the first control means 22 to the second control means 23 via the first transmission line 21a for a predetermined period of time, the abnormality detecting means 27 detects such an abnormality and generates a corresponding output signal to the drive means 26. As a result, the drive means makes the brake force control means 21 inoperative. Simultaneous with this, the output signal of the abnormality detecting means is input to the transmission inhibiting means 28 which then generates and sends an inhibition signal to the first control means 22 via the second transmission line 24b for inhibiting the transmission of information from the first control means 22 to the second control means 23 via the first transmission line 21a. In this manner, the safety in operation of the vehicle during such an abnormal situation can be substantially improved.

Figure 2:
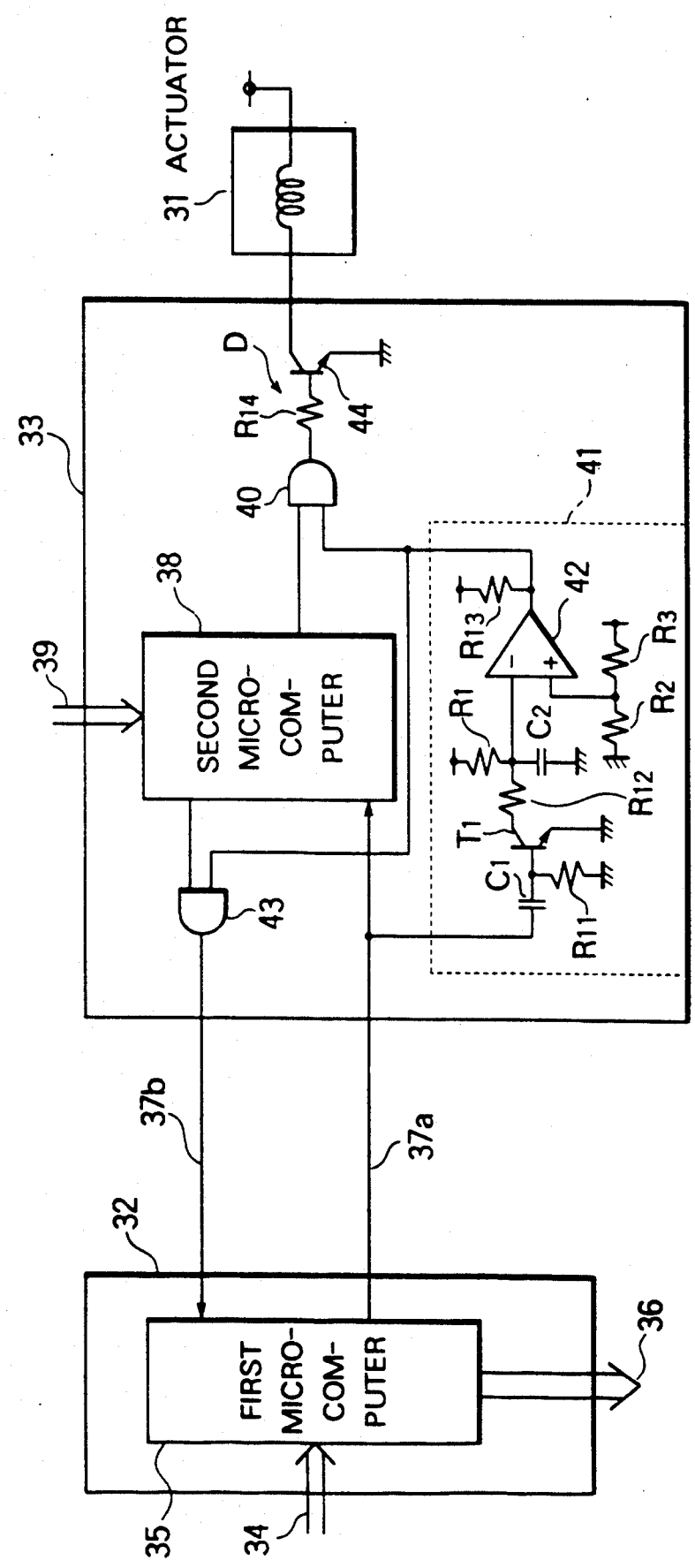
FIG. 2 is a block diagram of a concrete example of the electronic control apparatus of FIG. 1.
Figure 3:
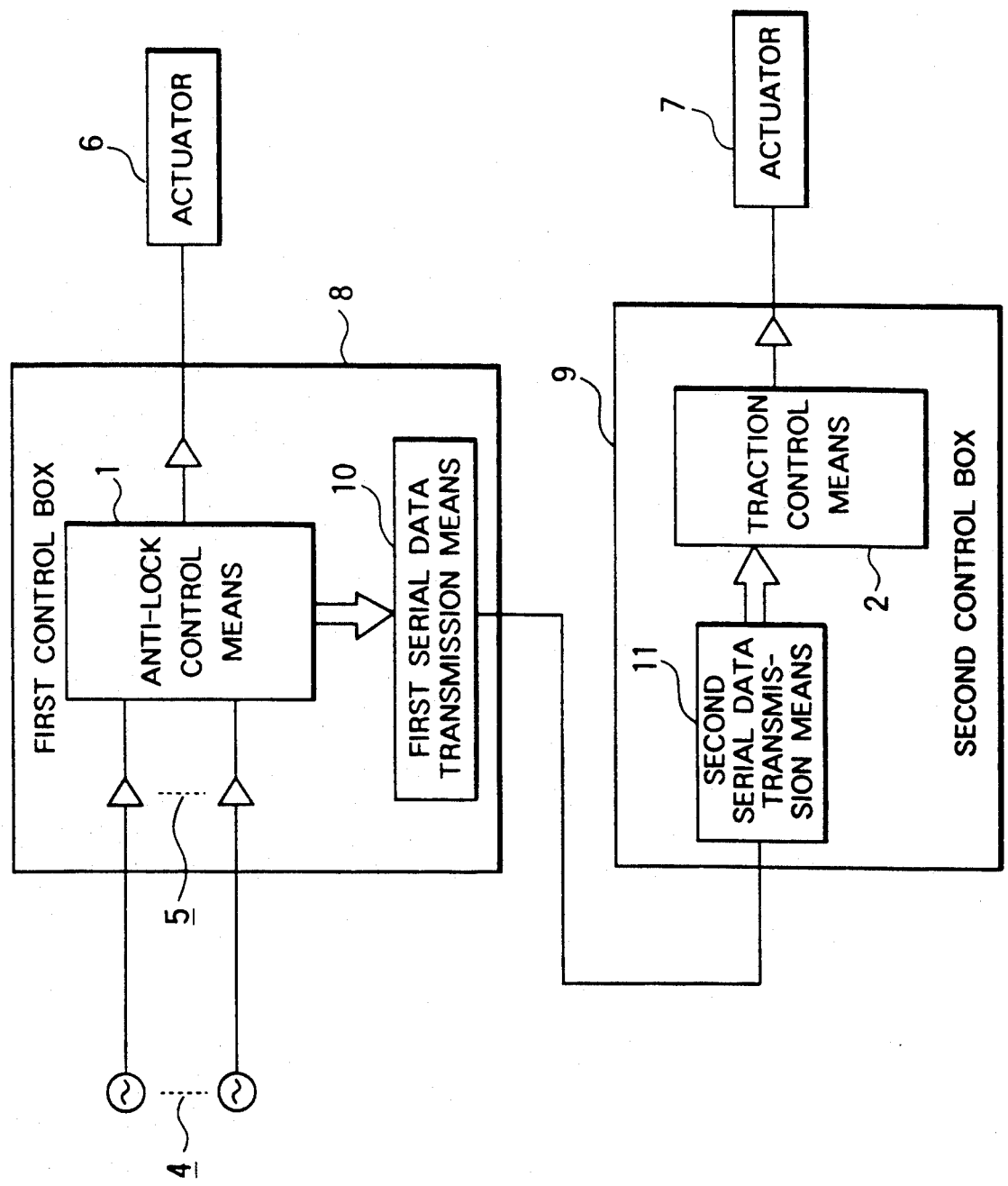
FIG. 3 is a schematic block diagram of a conventional electronic control apparatus for a vehicle.

Next, a more concrete example of the embodiment of FIG. 1 will be described while referring to FIG. 2. The electronic control apparatus illustrated in FIG. 2 includes a first control means a second control means 33 and an actuator in the form of a brake force control actuator having a valve incorporated therein for controlling brake forces. For the sake of simplicity of explanation, of these control means 32, 33, the second one is supposed to have a brake force controlling function. However, this relation can of course be reversed without any problem.

Various pieces of input information 34 are fed to the first control means 32 wherein a first microcomputer 35 processes the input information to provide various output signals 36 which are fed to various control devices (not shown). Also, the first microcomputer outputs a serial signal to a processing means 38 in the form of a second microcomputer of the second control means 33 via a first transmission line 37a. Other kinds of various information are also input to the second microcomputer 38 and processed there. Based on these pieces of information 34, 39 thus input, the second microcomputer 38 generates an output signal which is fed to a drive circuit D (which will be described in detail later) for driving the actuator 31.

The second control means 33 includes an abnormality detecting circuit 41 which is connected to the first transmission line 37a for detecting an interruption of data transmission through the transmission line 37a for a predetermined period of time. For example, the abnormality detecting circuit 41 can simply be constructed of a differentiator and a comparator means, as shown in FIG. 2. Specifically, a capacitor C1 has one end thereof connected to the first transmission line 37a and the other end thereof connected to a base of a transistor T1. A resistor R11 is connected at one end thereof to a node between the capacitor C1 and the base of the transistor T1 and at the other end thereof to ground. The transistor T1 has an emitter grounded and a collector connected through a resistor R12 to a negative or inverted input terminal of a comparator 42. A resistor R1 is connected at one end thereof to a power supply and at the other end thereof to a node between the resistor R12 and the negative input terminal of the comparator 42. A capacitor C2 is connected at one end thereof to ground and at the other end thereof to the node between the resistor R12 and the negative input terminal of the comparator 42. Thus, the resistor R1 and the capacitor C2 are series connected to each other between the power supply and ground. The comparator 42 has a positive or non-inverted input terminal connected to a junction between serially connected resistors R2, R3 which are connected between ground and a power supply. Thus, a reference voltage is imposed on the positive terminal of the comparator 42. The comparator 42 has an output terminal connected to a first input terminal of an AND gate 40 and to a first input terminal of a transmission inhibiting means 43 in the form of an AND gate which has a second input terminal connected to the second microcomputer 38 and an output terminal connected to the first microcomputer 35 through a transmission line 37b. The output terminal of the comparator 42 is also connected through a resistor R13 to a power supply. The AND gate 40 has a second input terminal connected to the second microcomputer 38 and an output terminal connected through a resistor R14 to a base of a transistor 44 which has an emitter grounded and a collector connected to the actuator The AND gate 40, the resistor 14 and the transistor 44 constitute the drive means D for driving the actuator 31.

In operation, when a data or information signal is periodically input from the microcomputer 35 of the first control means 32 to the abnormality detecting circuit 41 of the second control means 33 through the first transmission line 37a, it is differentiated by the capacitor C1 to turn on and off the transistor T1. When the transistor T1 is turned off, the capacitor C2 is charged through the resistor R1, whereas when the transistor T1 is turned on, the capacitor C2 discharges through the resistor R12 and the now conductive transistor T1, so that the voltage across the capacitor C2 is maintained below a predetermined voltage level.

When data transmission from the first microcomputer 36 to the second microcomputer 38 through the first transmission line 37a is interrupted for some reason, the transistor T1 is turned off so that the capacitor C2 is charged through the resistor R1 to raise the voltage thereacross. When the voltage of the capacitor C2 thus being charged increases above the reference voltage which is the voltage of the power supply (which is connected to the resistor R3) divided by the resistors R2, R3 and which is imposed on the positive terminal of the comparator 42, the output of the comparator 42, which is high during the time when signal transmission between the first and second control means 32, 33 is normal, becomes low. As a result, the output of the AND gate 40 also becomes low so that the actuator 31 remains inoperative irrespective of the signal output by the second microcomputer 38. Simultaneous with this, the output of the AND gate 43 also becomes low, whereby signal transmission from the second microcomputer 38 to the first microcomputer 36 is interrupted or inhibited. In this manner, in the event that data transmission from the first control means 32 to the second control means 33 is interrupted for the predetermined period of time, the actuator 31 is made inoperative and at the same time signal transmission from the second control means 33 to the first control means 32 is interrupted.

Although in the above embodiment, the second control means 33 alone is mainly described, the first control means 32 can also be constructed such that when the second control means 33 stops signal transmission, the first control means 32 detects this situation and stops data transmission to the second control means 33. This results in an improvement in the abnormality-checking function of the second control means 33.

Further, it is possible to provide a flip-flop in the abnormality detecting circuit 41 for storing the occurrence of such an abnormality.

In addition, a power interruption relay may be interposed between a power source and the actuator 31 so that it is interrupted upon detection of an abnormality in data transmission between the first and second control means 32, 33 for stopping the power supply to the actuator 31.

As described in the foregoing, according to the present invention, the first and second control means 22, 23 or 32, 33 are connected by transmission lines for data transmission therebetween, and the abnormality detecting circuit 27 or 41 of a simple construction is provided for detecting an interruption in data transmission for a prescribed length of time so that control of the actuator 21 or 31 such as a brake control actuator by the second control means 23 or 33 is stopped or nullified. With this construction, it is possible to stop or nullify the output of the second control means 23 or 33 upon occurrence of such an abnormality irrespective of whether or not the processing means 25 or 38 incorporated therein become faulty. This leads to an improvement in the operational safety of the vehicle.

What is claimed is:

1. An electronic control apparatus for a vehicle including first and second control means between which the transmission of information is performed, the apparatus comprising:
   means for processing information transmitted from the first control means to the second control means and controlling an actuator based on the information thus processed; and
   abnormality detecting means for detecting an interruption of signal transmission between the first and second control means for a predetermined period of time, the abnormality detecting means outputting a signal to stop the control of the actuator by said second control means when said abnormality detecting means detects said interruption such that said actuator becomes inoperative.

2. An electronic control apparatus according to claim 1, further comprising transmission inhibiting means for inhibiting signal transmission from the second control means to the first control means when the abnormality detecting means detects said interruption in the signal transmission from the first control means to the second control means for the predetermined period of time.

3. An electronic control apparatus according to claim 1, wherein the first and second control means are connected to each other through a first transmission line for transmitting a signal from the first control means to the second control means and a second transmission line for transmitting a signal from the second control means to the first control means, and the abnormality detecting means comprises an integrator connected to the first transmission line for integrating the output signal of the first control means, and a comparator for comparing the output signal of the integrator with a reference level and generating a high-level output at its output terminal when the integrator output is greater than the reference level, wherein said abnormality detecting means further comprises a differentiator coupled to an input of said comparator, said differentiator having a voltage level thereacross dependent upon an output signal from said integrator.

4. An electronic control apparatus according to claim 3, further comprising drive means for driving the actuator, the drive means including an AND gate which has a first input terminal connected to the output terminal of the comparator, a second input terminal connected to the processing means and an output terminal connected to the actuator.

5. An electronic control apparatus according to claim 3, wherein the transmission inhibiting means comprises an AND gate which has a first input terminal connected to the output terminal of the comparator, a second input terminal connected to the processing means and an output terminal connected to the first control means.

6. An electronic control apparatus according to claim 2, wherein the first control means operates to stop signal transmission when the transmission inhibiting means inhibits signal transmission from the second control means to the first control means.

7. An electronic control apparatus according to claim 1, wherein the processing means comprises a microcomputer.

* * * * *